Figure 1:
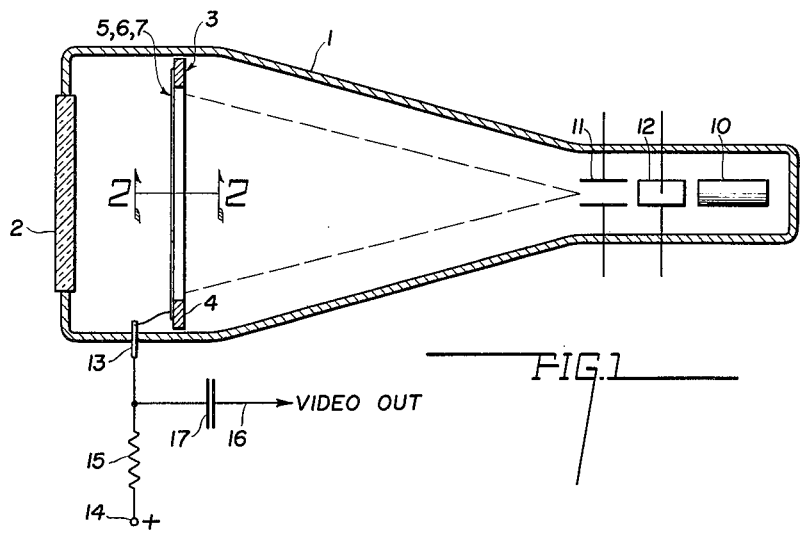

Sept. 18, 1962  E. H. EBERHARDT  3,054,917
HEAT IMAGING DEVICE
Filed Dec. 3, 1956

INVENTOR.
EDWARD H. EBERHARDT
BY
George A. Gust
ATTORNEY

United States Patent Office 3,054,917
Patented Sept. 18, 1962

3,054,917
HEAT IMAGING DEVICE
Edward H. Eberhardt, Fort Wayne, Ind., assignor to International Telephone and Telegraph Corporation
Filed Dec. 3, 1956, Ser. No. 627,536
3 Claims. (Cl. 313—65)

This invention relates to heat imaging device and is particularly directed to improved means for producing a video signal corresponding to a thermal image.

Photoconductive materials of different kinds respond to light in various portions of the visible and near-visible spectra. The apparent changes in resistivity presumably can be attributed to direct carrier excitation by the individual photons of light, inasmuch as there is no temperature change involved. The energy required for this direct excitation of current carriers imposes an unavoidable wavelength limitation which prevents photoconductors, as such, from being sensitive in the far infrared spectral region. Consequently, photoconductors cannot be used efficiently for detecting thermal images.

By direct comparison, thermo-resistive materials, i.e., materials having an electrical resistivity which varies with temperature, are almost equally sensitive throughout the entire infrared spectral region and are thus particularly suited to the detection of thermal images.

Because of the excessive loss of heat from all previous types of radiation sensitive layers by conduction, radiation and convection, and because of the high thermal inertia of the relatively thick substrates used for these layers, it has been impossible heretofore to obtain satisfactory high-resolution images of objects having temperatures near that of ambient surroundings.

The object of this invention is to provide an operative heat image detector utilizing thermo-resistive materials.

The object of this invention is attained by spreading over a thin film of extended area, supported only at the periphery, and of microscopic thickness first an ultra-thin electrically conductive coating and secondly an ultra-thin, preferably porous, layer of thermo-resistive material having a high thermal coefficient of resistivity, and then scanning the thermo-resistive layer electronically, by means well known to the art, to measure successively the resistance through elemental areas of this layer. By maintaining the lateral heat conductivity of this composite film to very low values, the loss of heat laterally along the surface of the film and to the film supports is reduced to negligible values, for most practical purposes, so that the power of the thermo-resistive layer to resolve the picture elements is relatively high.

Figure 2:
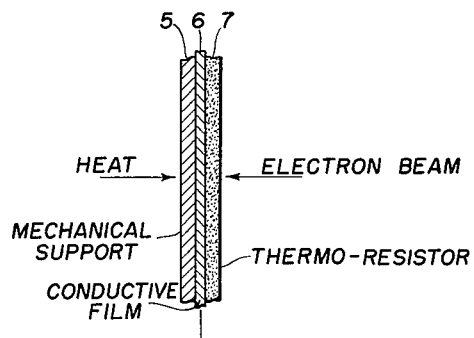

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a longitudinal sectional view of a device embodying this invention; and FIG. 2 is an enlarged detailed sectional view of the films embodied in the device on line 2—2 of FIG. 1.

The heat imaging system of this invention comprises the evacuated envelope 1 with the window 2, having good transmissivity of the heat image to be detected, and the thermo-resistive assembly 3. The assembly 3 comprises a supporting ring 4 across which is tautened a very thin membrane 5, FIG. 2, usually, but not necessarily, composed of a metal oxide such as aluminum oxide, and on which is deposited an ultra-thin layer of conductive metal 6, FIG. 2, and on which, in turn, is deposited a layer 7 of thermo-resistive material. The composite film is extremely thin and has low lateral heat conductivity so that each elemental area thereof may be selectively heated. The resistance of the elemental areas is then successively sensed by an electron beam scanned across the electrode. The thermo-resistive layer 7 may also be constructed in such a way as to have a porous or lattice structure, further isolating the elemental areas and reducing heat conduction losses.

More specifically, the envelope 1 is provided at one end with the heat-transmitting window 2, and at the other end with the electron gun 10. Means for vertical and horizontal deflection, such as plates 11 and 12, are provided. The envelope is exhausted and the beam source 10—11—12 is disposed to systematically scan the face of the thermo-resistive electrode 3 by means well known to the art. The ring 4 is supported parallel to the window. The film laminates across the ring, and as best shown in enlarged detail in FIG. 2, comprises the membrane 5. The membrane 5 may comprise, for example, a sheet of a metallic compound such as aluminum oxide peripherally supported by a frame of aluminum foil which, in turn, is adhesively joined or clamped to ring 4. Such a supporting membrane may be made, for example, by anodizing one surface of an aluminum foil and then etching away the aluminum of the foil in the central regions of the sheet to leave a film of aluminum oxide integrally joined to the peripheral unetched portion of the foil. The thickness of such layers may be of the order of .000004 inch and with such small mass or cross-sectional area that no measurable heat may travel along the sheet.

In manufacture, the film 5 thus supported is placed in a bell jar and the film 6 condensed thereon from an evaporated metal, such as silver or other good electrically conductive metal. A film which provides satisfactory electrical conductivity without excessive heat conduction losses may be of the order of .0000004 inch thick. Next, antimony sulphide or other thermo-resistive material such as germanium sulphide, GeS, arsenic trisulphide, $As_2S_3$, or selenium, is deposited in a layer 7. Antimony sulphide, $Sb_2S_3$, for example, can be made to condense on the film as discrete particles in a porous or lattice structure between which there is little heat conductivity. Antimony sulphide has been successfully deposited in a closed system exhausted and filled with dry nitrogen to a pressure between 1 and 1000 mm. of mercury. The thermo-resistive side of the electrode 3 is then mounted in the envelope facing the beam source and the electrode 6 is connected through lead-in 13 to the voltage source 14, through load resistor 15. The output 16 is coupled through the condenser 17 to the electrode-end of the load resistor 15. Hence, to the resistance of the electron beam, which may be of the order of 1 to 10 megohms, is added the variable face-to-face resistance of the layer 7, which is of the order of 10 to 10,000 megohms. As the beam deflects across the mosaic, large variations in output current from electrode 6 are produced in a manner similar to the operation of a standard "Vidicon" photoconductive television camera tube. If desired, electrodes concentric with the thermo-resistive electrode, such as Aquadag coating on the envelope wall, may be installed to remove secondary electrons released by the layer 7, or to shap the electric field as desired.

While the principles of the invention have been described in connection with specific apparatus, it is to be clearly understood that this description is made only by way of example and not as a limitation to the scope of the invention.

What is claimed is:

1. In a heat responsive device, a self-supporting membrane of an insulating metallic compound, said membrane being less than .00001 inch in thickness, a thin electrically conductive layer on said membrane having a thickness in the order of .0000004 inch, and a thin layer of thermo-resistive material in a porous structure on said film.

2. A heat image device comprising a thin self-supporting film of aluminum oxide having a thickness of less than .00001 inch, a thin film of metal having a thickness in the order of .0000004 inch on the said supporting film, and a thin film of thermo-resistive material on said metal film, said films of metal and thermo-resistive material being contiguous to the aluminum oxide film; and an electron gun for scanning the thermo-resistive film, and an output circuit connected to said metal film.

3. A heat imaging device comprising a supporting ring, a thin membrane of metallic oxide affixed to said ring and covering the opening therein, the thickness of said membrane being in the order of .00001 inch, a thin layer of conductive material on said membrane, the thickness of said layer being in the order of .0000004 inch, and a thin layer of thermo-resistive material on said conductive layer, said thermo-resistive material being of such thinness as to have a porous, lattice structure for maintaining lateral heat conductivity to a minimum.

References Cited in the file of this patent

UNITED STATES PATENTS

| | | |
|---|---|---|
| 2,541,374 | Morton | Feb. 13, 1951 |
| 2,654,853 | Weimer | Oct. 5, 1953 |
| 2,698,912 | Teves et al. | Jan. 4, 1955 |
| 2,744,837 | Forgue | May 8, 1956 |
| 2,745,032 | Forgue et al. | May 8, 1956 |
| 2,746,129 | Christensen | May 22, 1956 |
| 2,768,265 | Jenness | Oct. 23, 1956 |
| 2,788,452 | Sternglass | Apr. 9, 1957 |
| 2,816,954 | Huffman | Dec. 17, 1957 |
| 2,833,675 | Weimer | May 6, 1958 |
| 2,844,493 | Schlosser | July 22, 1958 |
| 2,935,711 | Christensen | May 3, 1960 |

OTHER REFERENCES

Photoconductivity in the Elements, by T. S. Moss, published by Academic Press Inc., New York 10, N.Y., 1952.